Aug. 23, 1966  J. F. GERBER  3,268,750
DUAL-MOTION FEEDTHROUGH APPARATUS
Filed July 26, 1963
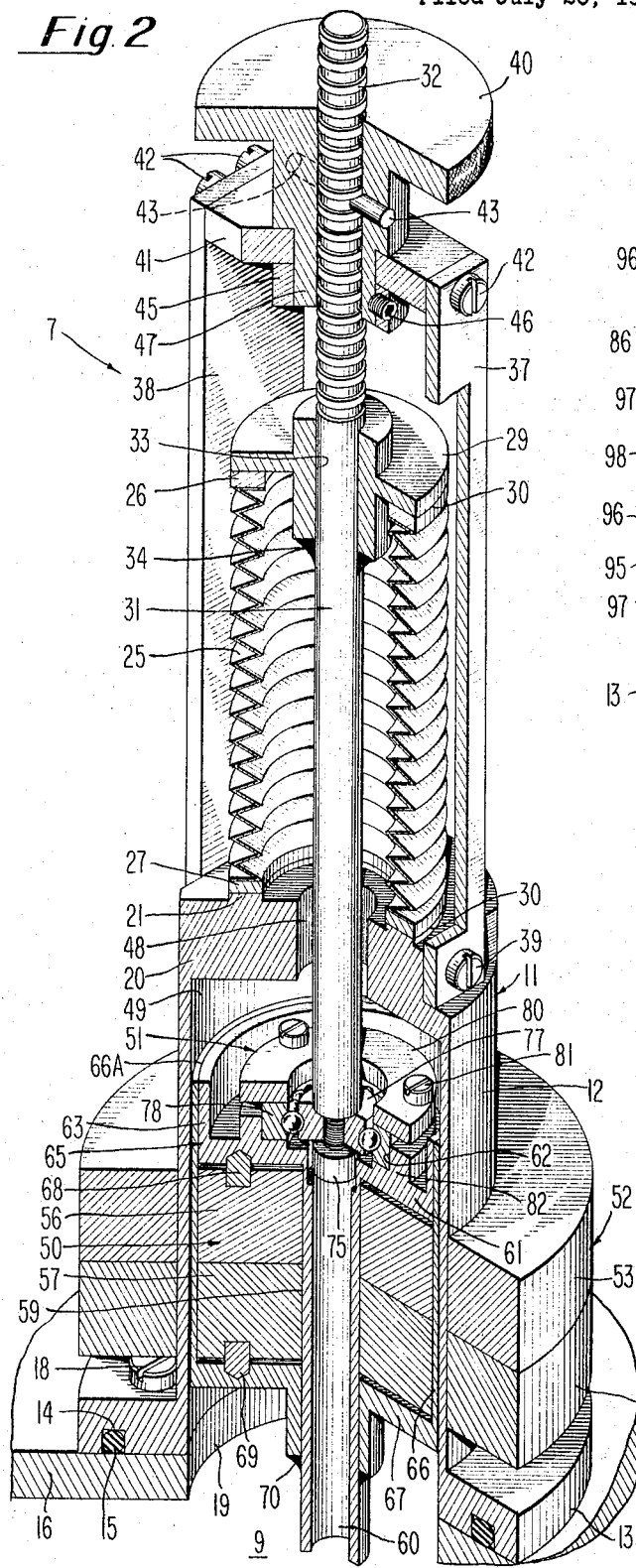
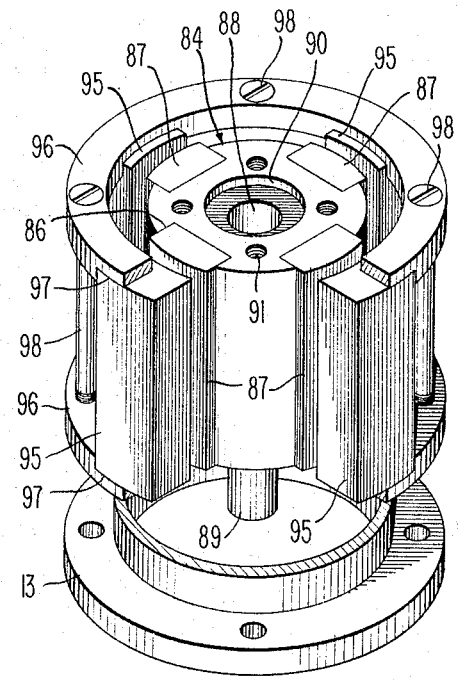
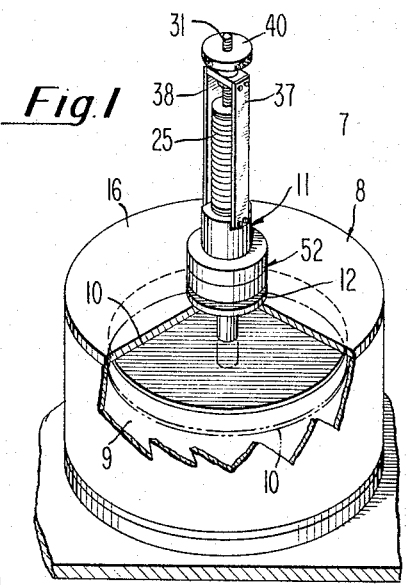
INVENTOR.
JOHANNES F. GERBER
BY
William R. Nolte
AGENT

United States Patent Office 3,268,750
Patented August 23, 1966

1

3,268,750
DUAL-MOTION FEEDTHROUGH APPARATUS
Johannes F. Gerber, King of Prussia, Pa., assignor to Burroughs Corporation, Detroit, Mich., a corporation of Michigan
Filed July 26, 1963, Ser. No. 297,823
9 Claims. (Cl. 310—96)

This invention relates to dual-motion feedthrough apparatus and more particularly to dual-motion feedthrough apparatus for use in a high vacuum chamber which combines both rotary and rectilinear motion into a single feedthrough.

In vacuum deposition work it is desirable to be able to perform certain manipulations inside a high vacuum work chamber without bringing about a temporary rise in pressure. In the lower vacuum ranges, sliding and turning shafts sealed by O-ring gaskets have often been found acceptable for this purpose, provided that pumping speeds are high enough to offset the leakage usually inherent in dynamic elastomer seals. However, where an appreciably higher vacuum is required, and high temperatures are employed in the vacuum chamber, such seals have usually been found to be unsatisfactory.

It is an object of this invention therefore, to provide an improved dual-motion feedthrough apparatus for use in conjunction with a high vacuum system which avoids one or more of the disadvantages of the prior art arrangements.

It is a further object of this invention to provide novel apparatus for introducing longitudinal and rotary motion into a vocuum chamber without the need for dynamic seals.

In accordance with the foregoing objects the mechanical feedthrough of the present invention comprises a cylindrical housing which is sealed at one end to a vacuum chamber and includes an elongated bellows integral with its other end. The bellows is sealed by a flanged cap having shaft supporting means on opposite sides thereof. The cylindrical housing and bellows constitute a vacuum tight assembly that can be evacuated along with the vacuum chamber. An actuating rod is supported within the houisng and bellows by the flanged cap and includes a bearing assembly which supports an inner magnet assembly for rotation within the housing. The magnet assembly includes a shaft extension which moves within the vacuum chamber carrying a workpiece so that the same may be rectilinearly and rotatably positioned within the chamber. An external magnet assembly supported coaxially with said inner magnet for rotation about the outer surface of the houisng is effective to transmit rotation to the inner magnet assembly in either direction about the axis of the rod. A support frame mounted on either side of the bellows holds a bearing plate in which a hand wheel is mounted for rotation to engage a threaded screw portion of the actuating rod. When so rotated the actuating rod may be moved longitudinally of its axis thus to move the inner magnet assembly. The external magnets are magnetically coupled to the inner magnet assembly through the thin wall of the cylindrical housing and ride up and down on the surface of asid houisng with such longitudinal movement.

For a better understanding of the present invention together with other and further objects thereof reference is had to the following description taken in connection with the accompanying drawing and its scope will be pointed out in the appended claims.

In the drawing:

FIG. 1 is anisometric view, partially in section, showing the feedthrough apparatus of the invention in sealing arrangement with a high vacuum chamber;

2

FIG. 2 is a greatly enlarged isometric view, partially in section, illustrating the dual-motion feedthrough apparatus;

FIG. 3 is an isometric view of a modified form of the invention.

Referring to FIG. 1 there is shown a high vacuum dual-motion feedthrough apparatus 7 assembled in relation to vacuum apparatus 8 to permit sequential evaporation of circuitry, magnetic elements and the like in a single operation. The apparatus enables certain manipulations within the vacuum work chamber 9 to be performed without bringing about a temporary rise in pressure. A workpiece 10 suitably secured to the feedthrough apparatus may be both indexed circularly to various positions or moved linearly vertically up and down from its full line to the dotted line position shown by means of the apparatus 7.

As illustrated in greater detail in FIG. 2, feedthrough apparatus 7 for introducing longitudinal and rotary motion into the vacuum chamber 9 comprises a main tubular housing 11 having a base portion 12, with a base flange 13. This flange is provided with a groove 14 to receive an elastomer seal 15 for engagement with the top wall 16 of the vacuum chamber 9. Screws 18 spaced about the periphery of the base flange 13 mount the apparatus in position relative to opening 19 in wall 16 of the vacuum chamber.

The top of the base housing 12 is in the form of a thick walled section 20 and includes a raised annulus 21 which constitutes a mating surface for bellows 25, the latter having top and bottom securing rings 26, 27, respectively. The top of the bellows is sealed by means of a cap or sealing flange member 29 secured to ring 26 as by welding 30. In a similar manner the lower bellows ring 27 is secured to the annulus 21 of base housing 12 as by welding 30, which may be preformed without the use of filler materials by simple fusing of the relatively thin mating edges. An activating rod 31, threaded along its upper end 32 is passed through bore 33 of sealing flange member 29 and is welded thereto as at 34. Two brackets 37, 38 are affixed to the external top portion of base housing 12 as by screws 39 to support a transverse bearing plate 41 which receives hand wheel 40. The bearing plate 41 is secured to the upper ends of mounting brackets 37, 38 by screws 42. The hand wheel which is freely rotatable in the bearing plate contains two round replaceable brass pins 43 which engage the square threads 32 of activating rod 31 in only two places. The use of the pins in this manner holds friction between the handwheel 40 and the threads of activating rod 31 to a minimum, and consequently minimizes the twisting forces applied to the bellows 25. A retaining ring 45 and set screw 46 surround the lower shaft portion 47 of the hand wheel to prevent longitudinal motion so that it cannot slide out of the bearing plate 41 when rotated. The unthreaded portion of the activating rod 31 is shown extending axially through the bellows and through an aperture 48 in the thick walled top 20 of base 12, and into cylindrical bore 49 of base member 12.

An inner magnet assembly 50 is secured to the lower extremity of the activating rod by means of ball bearing assembly 51, and the external surface of housing 12 provides a bearing surface about which an outer magnetic assembly 52, consisting of integrally united top and bottom ring magnets 53, 54 is rotatable. The inner and outer magnet assemblies are magnetically coupled so that a rotary force component applied to the outer magnet assembly through the thin wall cylindrical section of housing 12 produces a torque causing the inner magnet assembly 50 to rotate about the axis of rod 31. Further, when the actuating rod 31 is moved axially, either up or down, by turning hand wheel 40, the magnetic coupling between the inner and outer magnetic assemblies 50, 52 is effective to cause the outer magnet assembly to move along the axis the same amount. It should be noted that the tubular housing 11 is made of some non-magnetic material such as stainless steel to permit the above magnetic coupling.

In the present embodiment of the invention, the inner magnet assembly 50 which includes a set of ring magnets 56, 57 is shown encapsulated in a two-part shell 65, also formed of non-magnetic material. The inner shell portion 59 consists of a hollow central shaft 60 and a radially extending top flange 61, the latter having a hollow bore 62 on its upper face and concentric up-turned rim or lip portion 63. The outer part of shell 65 includes a thin cylindrical sleeve 66 and a bottom flange 67. When assembled within the two-part shell, the magnets 56, 57 are fitted within the cavity formed by the members, and pin 68 set in magnet 56 together with flange 67, and pin 69 set in magnet 57 and flange 61, prevent any shifting of the magnets relative to the shell members. To provide a unitary assembly of the capsule after the ring magnets are assembled in the capsule halves, the upturned lip 63 of flange 61 is soldered, welded or otherwise joined to the top edge of outer shell 66 as at 66a, and the bottom edge of flange 67 is welded to hollow shaft 60 as at 70. The capsule when so joined prevents outgassing and forstalls any leakage of the magnets during pump down operations of the vacuum chamber. The center shaft 60 is hollow to permit insertion of cap screw 75 which is effective to hold the inner race 77 of the ball bearing assembly 51 to the activating rod 31. As illustrated, the outer race 78 of the ball bearing assembly is received within the bore 62 in flange 61 and is secured in place by means of a retaining flange 80 as by screws 81 passed therethrough and received in upstanding shoulder 82, formed in the flange 61.

From the above description it is seen that whenever the inner magnet assembly undergoes linear displacement by turning hand wheel 40 in the appropriate direction, the outer magnet assembly 52, being loosely fitted on the tubular housing 12, is free to slide up or down to maintain alignment by means of the magnet coupling between the assemblies. Correspondingly, if the outer magnet housing 52 is circularly indexed or otherwise rotated about the housing 12 such motion by means of the magnetic coupling is thus transmitted to the inner magnet assembly 50 to thereby rotate the workpiece 10, FIG. 1, about the axis of shaft 60. It is thus seen that all movement, both linear and rotative, is transmitted to the high vacuum work chamber by means of the shaft 60 which is integral with the inner magnet assembly 50.

Referring now to FIG. 3 a modified form of the invention is shown utilizing bar-type magnets in lieu of the ring-type magnets shown in FIG. 2. In this configuration an inner magnet assembly 84 is provided which includes a central carrier 85 of cylindrical form and which is of non-magnetic material such as aluminum or stainless steel. The central carrier contains an elongated groove 86 in each quadrant about its periphery. A bar magnet 87 is press-fitted or otherwise secured in each groove and a center bore 88 has suitably affixed therein a center shaft 89 which projects below its bottom surface. The latter shaft is adapted to extend at various levels into the vacuum chamber 9, FIG. 1, and to carry as heretofore described, a workpiece 10 or other object for sequential manipulation within said chamber. The upper surface of the carrier is counterbored as at 90 to receive the outer race 78 of bearing assembly 51 which likewise may be fastened as indicated in FIG. 1, by means of ball bearing retaining flange 80 and screws 81, the latter being received in holes 91 disposed about the periphery of the counterbore. The hollow center 88 likewise permits insertion of the cap screw 75 which is used to hold the inner race of the ball bearing assembly 51 to the activating rod 31. The inner magnet assembly when so secured may travel linearly within the cylindrical cavity of housing 11. The outer surfaces of the inner bar magnets are formed with a surface radius greater than that of the carrier 85 and are of a radius to conform to the inner bore 49 of the cylindrical housing 12.

The outer magnet assembly 93 includes a set of bar magnets 95, corresponding in number to the inner magnets 87, and which are gripped between top and bottom rings 96 within grooves 97. The top and bottom rings are drawn together by a plurality of bolts 98 passed therebetween to maintain the outer bar magnets in aligned axial relationship with said inner magnets. The outer bar magnets are also ground or otherwise formed to conform to the outer radius of the housing 12 for unlimited rotation in either direction about the outer surface of the housing 11. Movement of the outer bearing assembly 95 along the axis of the cylindrical housing occurs upon rotation of hand wheel 40, and moreover, the total stroke limits of the magnets are determined by the dimensions and choice of bellows 25.

While there have been described what are at present considered to be the preferred embodiments of the invention, it will be obvious to those skilled in the art that various changes and modifications may be made therein without departing from the invention, and it is therefore, aimed in the appended claims to cover all such changes and modifications as fall within the true spirit and scope of the invention.

What is claimed is:

1. In a dual-motion feedthrough apparatus for a vacuum chamber the combination comprising, an elongated housing of non-magnetic material for sealing engagement with said vacuum chamber and including one portion thereof collapsible along its axis, inner magnet means connected to said collapsible portion for axial movement in the other portion of said housing, means for applying force to sad collapsible portion, and, outer magnet means mounted for rotational movement about the external surface of said other portion for magnetic coupling engagement with said inner magnet means to rotate the latter about said axis independently of its movement along said axis.

2. In a dual-motion feedthrough apparatus for a high vacuum chamber the combination comprising, an elongated housing of nonmagnetic material having an end portion collapsible along its axis for sealing said high vacuum chamber, inner magnet means connected to said collapsible end portion for movement axially within said housing, outer magnet means magnetically coupled to said inner magnet means and mounted for rotation about and for axial movement along said elongated housing, and means for collapsing the end portion of said elongated housing along its axis.

3. In a dual-motion feedthrough apparatus for a high vacuum chamber the combination comprising, an elongated housing of non-magnetic material having a collapsible end portion for sealing engagement with said vacuum chamber, rod means connected to said collapsible end portion, inner magnet means rotatably connected to said rod means and mounted for axial movement within said elongated housing, means connected to said housing for collapsing said collapsible portion to move said inner magnet along the axis of said cylindrical housing, and outer magnet means magnetically coupled to said inner magnet means and externally of said housing for rotation about the axis of said housing for introducing rotation of said inner magnet means about the axis of said rod means.

4. In a dual-motion feedthrough apparatus for a vacuum chamber the combination comprising, a tubular housing having a thick walled section at one end and a flanged portion for sealing said vacuum chamber at its other end, bellows means secured to said thick walled section and communicating with said vacuum chamber, activating rod means extending axially within said bellows means, inner magnet means mounted for linear and rotational movement within said tubular housing and including a shaft portion for supporting an object within said vacuum chamber, bearing means including an outer race secured to said inner magnet means and an inner race secured to said activating rod means, means mounted upon said housing for actuating said bellows along its axis to thereby impart like movement to said object in said vacuum chamber, outer magnet means mounted for bearing on the external surface of said tubular housing for rotating said inner magnet means and said object within said vacuum chamber independent of its axial movement.

5. In a dual-motion feedthrough apparatus for a high vacuum chamber the combination comprising, an elongated housing of non-magnetic material having a collapsible end portion for sealing engagement with said vacuum chamber, rod means connected to said collapsible end portion, inner magnet means mounted for sliding axial movement within said elongated housing, bearing means connecting said magnet means to said rod means for rotation in either direction about the axis of said elongated housing, means connected to said housing for collapsing said collapsible portion to move said inner magnet along the axis of said cylindrical housing, and outer magnet means magnetically coupled to said inner magnet means and externally of said housing for rotation about the axis of said housing for introducing rotation of said inner magnet means about the axis of said rod means.

6. In a dual-motion feedthrough apparatus for a vacuum chamber the combination comprising, a tubular housing having a thick walled section at one end and a flanged portion for sealing said vacuum chamber at its other end, bellows means secured to said thick walled section and communicating with said vacuum chamber, activating rod means extending axially within said bellows means, inner magnet means including a shaft portion for supporting an object within said vacuum chamber, said magnet means being mounted upon said rod for rotation in either direction about the axis of said rod, bracket means secured to said thick walled section of said housing, lead screw means mounted in said bracket means for actuating said bellows along its axis to thereby impart like movement to said object in said vacuum chamber, outer magnet means mounted for bearing on the external surface of said tubular housing for rotating said inner magnet means, and said object within said vacuum chamber independent of its axial movement.

7. In a dual-motion feedthrough apparatus for a high temperature high vacuum chamber the combination comprising, a tubular housing having a thick walled section at one end and a flanged portion for sealing said vacuum chamber at its other end, bellows means secured to said thick walled section and communicating with said vacuum chamber, inner magnet assembly means mounted for rectilinear and rotational movement within said tubular housing and including a plurality of ring magnets, first and second shell members for housing said magnets to prevent the same from outgassing when subjected to high temperatures, bearing means including an outer race secured to said first shell member and an inner race secured to said activating rod means, said second shell means including a shaft portion for supporting an object for movement into said vacuum chamber, means mounted upon said housing for actuating said bellows along its axis to thereby impart like movement to said object in said vacuum chamber, outer magnet means mounted for bearing on the external surface of said tubular housing for rotating said inner magnet means and said object within said vacuum chamber independent of its axial movement.

8. In a dual-motion feedthrough apparatus for a vacuum chamber the combination comprising, a tubular housing having a thick walled section at one end and a flanged portion for sealing said vacuum chamber at its other end, bellows means secured to said thick walled section and communicating with said vacuum chamber, activating rod means extending axially within said bellows means, bearing means including an outer race secured to said central carrier and an inner race secured to said activating rod means, said central carrier including a shaft portion for supporting an object within said vacuum chamber, means mounted upon said housing for actuating said bellows along its axis to thereby impart like movement to said object in said vacuum chamber, inner magnet assembly means mounted for linear and rotational movement within said tubular housing, said inner magnet means having a central carrier and including a plurality of inner bar magnets axially aligned and disposed about its periphery, the outer surfaces of said bar magnets being shaped to conform to the inner diameter of said tubular housing, outer magnet means mounted for bearing on the external surface of said tubular housing for rotating said inner magnet means and said object within said vacuum chamber independent of its axial movement, said outer magnet means being magnetically coupled to said inner magnet means and including a support means, a plurality of outer bar magnets corresponding in number to said inner bar magnets and shaped to conform to the outer surface of said tubular housing whereby rotation of said outer magnet means in either direction imparts like rotational movement to said inner magnet means.

9. In a dual-motion feedthrough apparatus having a vacuum chamber the combination comprising, an elongated housing of non-magnetic material having a collapsible end portion for sealing engagement with said vacuum chamber, rod means integral with said collapsible end portion and having one end thereof extending axially within said collapsible portion and said elongated housing, the other end of said housing being threaded, inner magnet means rotatably connected to said one end of said rod means and mounted for axial movement within said elongated housing, hand wheel means including a pair of opposed pins disposed in opposed relation one to the other, for engagement with the threaded other end of said rod means to collapse said collapsible portion and to thereby move said inner magnet along the axis of said cylindrical housing, and outer magnet means magnetically coupled to said inner magnet means and mounted externally of said housing for rotation about the axis of said housing for introducing rotation of said inner magnet means about the axis of said rod means.

References Cited by the Examiner
UNITED STATES PATENTS 2,497,702  2/1950  Terpak _____ 310—104 X
2,898,485  8/1959  Richter _____ 310—104

MILTON O. HIRSHFIELD, *Primary Examiner.*

D. X. SLINEY, *Assistant Examiner.*